May 11, 1926.

E. A. PARKER

VIBRATOR ARMATURE TESTER

Filed July 7, 1925

1,584,242

Inventor
E. A. Parker.
By Clarence A. O'Brien
Attorney

Patented May 11, 1926.

1,584,242

UNITED STATES PATENT OFFICE.

EUGENE ALLEN PARKER, OF MORRILLTON, ARKANSAS.

VIBRATOR-ARMATURE TESTER.

Application filed July 7, 1925. Serial No. 41,984.

The present invention relates to a vibrator armature tester and aims to provide a device of this nature which may be rested on the vibrator armature to test the tension thereof to ascertain whether or not the points between the vibrator armature and the vibrator bridge separate properly when the coil unit used in the ignition system of a Ford automobile is in actual operation.

Another very important object of the invention is to provide a testing device of this nature which includes a fixed weight with means for resting said weight on the vibrator armature so as to separate the points of the vibrator a predetermined distance if said vibrator armature has the proper tension.

Another very important object of the invention is to provide a device of this nature which is exceedingly simple in its construction, inexpensive to manufacture, efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 1:
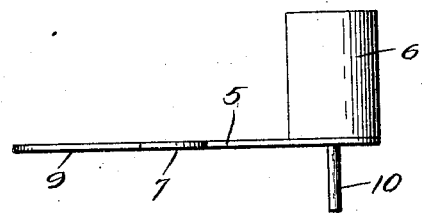
Figure 1 is a side elevation of the tester embodying the features of my invention.
Figure 2:
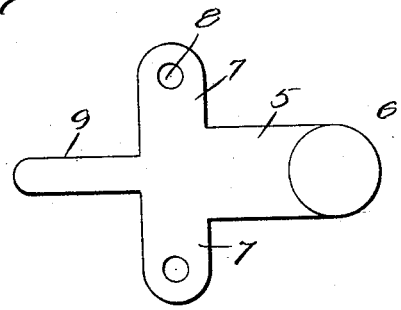
Figure 2 is a top plan view thereof.
Figure 3:
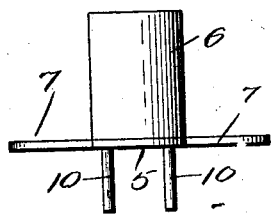
Figure 3 is an end elevation thereof.

Referring to the drawing in detail, it will be seen that 5 designates the body of the device which is in the form of an elongated plate having a weight element 6 rising from one end and transversely extending ears 7 at its other end, said ears being provided with apertures 8. A gage extension 9 extends from the end provided with the ears 7, in alignment with the median dimension of the plate body 5. A pair of legs 10 are provided on the plate body 5 and extend therefrom in an opposite direction from the weight 6.

In using the device the apertures 8 are engaged over the screws of the vibrator bridge and the legs 10 rested on the free end of the vibrator armature. If the armature has the proper tension, the weight 6 will be sufficient to just separate the points of the coils. Should the vibrator armature not be forced downwardly so that the points of the coils just break, then the armature must be regulated in the usual manner so as to obtain the proper tension. The gage 9 has a thickness equal to the proper gap between the coil points.

From the above it will be seen that I have devised a very simple tester, which when properly constructed, will enable one to fix the vibrator of a coil unit such as is used in Ford automobiles very quickly and accurately, so as to obtain a good hot spark. It is obvious that the device has other usages of an analogous nature.

The present embodiment of the invention has been disclosed merely by way of detail and embodies all the features of advantage enumerated as desirable in the statement of the invention and the above description. It is apparent that changes in the details of construction, in the sizes, and in the materials may be resorted to without departing from the spirit or scope of the invention as hereinafter claimed or sacrificing any of its advantages.

Having thus described the invention, what I claim as new and desire to secure by Letters Patent is:—

1. A tester of the class described including a body having screw engaging means at one end, a weight at the other end, and means at said other end for engaging a vibrator armature so that the weight will rest thereon.

2. A testing device of the class described including a plate body, ears projecting transversely from one end thereof, a weight on the other end thereof, and a pair of legs on said other end extending from the body in an opposite direction to the weight so that said legs may straddle the vibrator bridge and rest on the vibrator armature when said ears are engaged with the screws of the vibrator bridge.

3. A testing device of the class described including a plate body, ears projecting transversely from one end thereof, a weight on the other end thereof, and a pair of legs on said other end extending from the body in an opposite direction to the weight so that said legs may straddle the vibrator bridge and rest on the vibrator armature when said ears are engaged with the screws of the vibrator bridge, said ears being provided with apertures.

4. A testing device of the class described including a plate body, ears projecting transversely from one end thereof, a weight on the other end thereof, and a pair of legs on said other end extending from the body in an opposite direction to the weight so that said legs may straddle the vibrator bridge and rest on the vibrator armature when said ears are engaged with the screws of the vibrator bridge, said ears being provided with apertures, and a gage extending from the end of the plate body having the ears, said extension being aligned with the median dimension of the plate body.

In testimony whereof I affix my signature.

EUGENE ALLEN PARKER.